(12) United States Patent
Rijnveld et al.

(10) Patent No.: US 12,405,157 B2
(45) Date of Patent: Sep. 2, 2025

(54) OPTICAL FIBER-BASED HYDROPHONE

(71) Applicant: OPTICS11 B.V., Amsterdam (NL)

(72) Inventors: Niek Rijnveld, Amsterdam (NL); Peter Polyvas, Amsterdam (NL); Arun Gunda, Amsterdam (NL); Rudolf Kyselica, Amsterdam (NL); Grzegorz Gruca, Amsterdam (NL)

(73) Assignee: OPTICS11 B.V., Amsterdam (NL)

( * ) Notice: Subject to any disclaimer, the term of this patent is extended or adjusted under 35 U.S.C. 154(b) by 181 days.

(21) Appl. No.: 18/289,808

(22) PCT Filed: May 9, 2022

(86) PCT No.: PCT/NL2022/050253
§ 371 (c)(1),
(2) Date: Nov. 7, 2023

(87) PCT Pub. No.: WO2022/240287
PCT Pub. Date: Nov. 17, 2022

(65) Prior Publication Data
US 2024/0288302 A1    Aug. 29, 2024

(30) Foreign Application Priority Data
May 8, 2021   (NL) .......................... 2028176

(51) Int. Cl.
*G01H 9/00*   (2006.01)
*G01D 5/353*  (2006.01)
(Continued)

(52) U.S. Cl.
CPC ......... *G01H 9/004* (2013.01); *G01D 5/35303* (2013.01); *G01V 1/188* (2013.01); *H04R 1/44* (2013.01); *G02B 6/0208* (2013.01)

(58) Field of Classification Search
CPC .... G01H 9/004; G01D 5/35303; G01V 1/188; G01V 1/186; H04R 1/44; G02B 6/0208
See application file for complete search history.

(56) References Cited

U.S. PATENT DOCUMENTS 4,568,408 A   2/1986  Schmadel et al.
5,363,342 A  11/1994  Ayton et al.
(Continued)

FOREIGN PATENT DOCUMENTS

EP   4334756 B1 * 10/2024 ............... H04R 1/44
NL   2028176 B1 * 11/2022 ............... H04R 1/44
(Continued)

OTHER PUBLICATIONS

International Search Report and Written Opinion dated Jul. 4, 2022, for International Patent Application No. PCT/NL2022/050253.

*Primary Examiner* — Daniel Pihulic
(74) *Attorney, Agent, or Firm* — KARCESKI IP LAW, PLLC

(57) ABSTRACT

A hydrophone has a mandrel with a shell and a cylindrical cavity inwardly adjacent to the shell. A passage provides fluid communication between the cylindrical cavity and an exterior environment surrounding the mandrel. The hydrophone further has an optical fiber having an optical sensing section that is at least partially wound on the mandrel. The optical sensing section has an optical characteristic that varies as a function of a radial dimension of the mandrel. The mandrel has a core of solid material having a bulk modulus lower than 0.1 GPa. The cylindrical cavity is between the core and the shell.

30 Claims, 3 Drawing Sheets

(51) Int. Cl.
  *G01V 1/18* (2006.01)
  *G02B 6/02* (2006.01)
  *H04R 1/44* (2006.01)

(56) References Cited

U.S. PATENT DOCUMENTS

| | | |
|---|---|---|
| 6,233,374 B1 | 5/2001 | Ogle et al. |
| 7,466,631 B1 | 12/2008 | Ames |
| 2010/0313659 A1 | 12/2010 | Berg et al. |
| 2024/0288302 A1* | 8/2024 | Rijnveld .................. H04R 1/44 |

FOREIGN PATENT DOCUMENTS

| | | | |
|---|---|---|---|
| WO | 2017026896 A1 | 2/2017 | |
| WO | WO-2022240287 A1 * | 11/2022 | ............... H04R 1/44 |

* cited by examiner

OPTICAL FIBER-BASED HYDROPHONE

CROSS-REFERENCE TO RELATED APPLICATION(S)

This is a National Stage Entry into the United States Patent and Trademark Office from International Patent Application No. PCT/NL2022/050253, filed on May 9, 2022, which relies on and claims priority to Netherlands Patent Application No. 2028176, filed on May 8, 2021, the entire contents of which both of which are incorporated herein by reference.

FIELD OF THE INVENTION

An aspect of the invention relates to an optical fiber-based hydrophone. The hydrophone may be used, for example, in an optical sensor system for acoustic measurements and seismic measurements in water, in particular in seas and oceans at relatively great depth. Further aspects of the invention relate to a hydrophone assembly, an optical sensor system, and an optical sensing method.

BACKGROUND OF THE INVENTION

Patent publication U.S. Pat. No. 7,466,631B1 discloses an interferometric hydrophone operable for use in surrounding fluid. The hydrophone includes an outer mandrel having an interior open to the surrounding fluid. A sensing optical fiber is wound on the exterior of the outer mandrel. An inner mandrel is positioned in the interior of the outer mandrel. A chamber defined between the inner mandrel and outer mandrel is in communication with the surrounding fluid. The inner mandrel has a sealed gas filled interior. Compression and expansion of the inner mandrel results in compression and expansion of the outer mandrel.

SUMMARY OF THE INVENTION

There is a need for a hydrophone that is improved on at least one of the following points: sensitivity and cost of manufacture.

In accordance with an aspect of the invention, there is provided a hydrophone comprising:
  a mandrel comprising:
    a shell;
    a cylindrical cavity inwardly adjacent to the shell; and
    a passage that provides fluid communication between the cylindrical cavity and an exterior environment surrounding the mandrel; and
  an optical fiber comprising an optical sensing section that is at least partially wound on the mandrel, the optical sensing section having an optical characteristic that varies as a function of a radial dimension of the mandrel,
    wherein the mandrel comprises a core of solid material having a bulk modulus lower than 0.1 GPa, the cylindrical cavity being comprised between the core and the shell.

The core of solid material thus has a relatively low bulk modulus, which makes that the hydrophone as defined hereinbefore is relatively compliant to pressure variations. Specifically, the bulk modulus of the core may be lower than a filling liquid that has entered and filled the mandrel through the passage. The mandrel may thus exhibit relatively large variations in diameter in response to pressure variations of a given amplitude. As a result, variations in the optical characteristic of the optical sensing section in the hydrophone, which can be measured, will be relatively large. This allows the hydrophone to be relatively sensitive.

Notwithstanding, the hydrophone may be relatively resistant to high constant hydrostatic pressures. This is because the passage in the mandrel makes that a relatively large constant hydrostatic pressure that is exerted on an outside surface of the shell is also exerted on an inside surface of the shell. This prevents the shell from undergoing relatively large strain in conditions where hydrostatic pressure is relatively high. The core, although comprising solid material having a relatively low bulk modulus, may be relatively resistant to being damaged in case a relatively high constant hydrostatic is exerted on the core. The hydrophone may thus be used underwater at relatively great depth, while allowing sensitive measurements.

In addition, a hydrophone as defined hereinbefore may be less acoustically detectable than a hydrophone comprising a sealed gas filled interior, which is described in the aforementioned patent publication. Being less acoustically detectable may be desired in, for example, defense applications.

A hydrophone as defined hereinbefore may be manufactured in a relatively simple manner. Relatively simple operations are sufficient to ensure that the core of solid material is appropriately fitted inside the shell leaving a cylindrical cavity between the shell and the core. Relatively simple operations are also sufficient to make that the cylindrical cavity is sealed, except for at least one passage that allows fluid communication with an exterior environment.

In accordance with a further aspect of the invention, there is provided a hydrophone assembly comprising an encapsulating tube that incorporates a hydrophone as defined hereinbefore.

In accordance with a yet further aspect of the invention, there is provided an optical sensor system comprising a hydrophone as defined hereinbefore and an optical readout arrangement adapted to measure the optical characteristic of the optical sensing section in the hydrophone.

In accordance with a yet further aspect of the invention, there is provided an optical sensing method comprising use of a hydrophone as defined hereinbefore.

For the purpose of illustration, some embodiments of the invention are described in detail with reference to accompanying drawings. In this description, additional features will be presented, some of which are defined in the dependent claims, and advantages will be apparent.

DESCRIPTION OF EMBODIMENT(S) OF THE INVENTION

Figure 1:
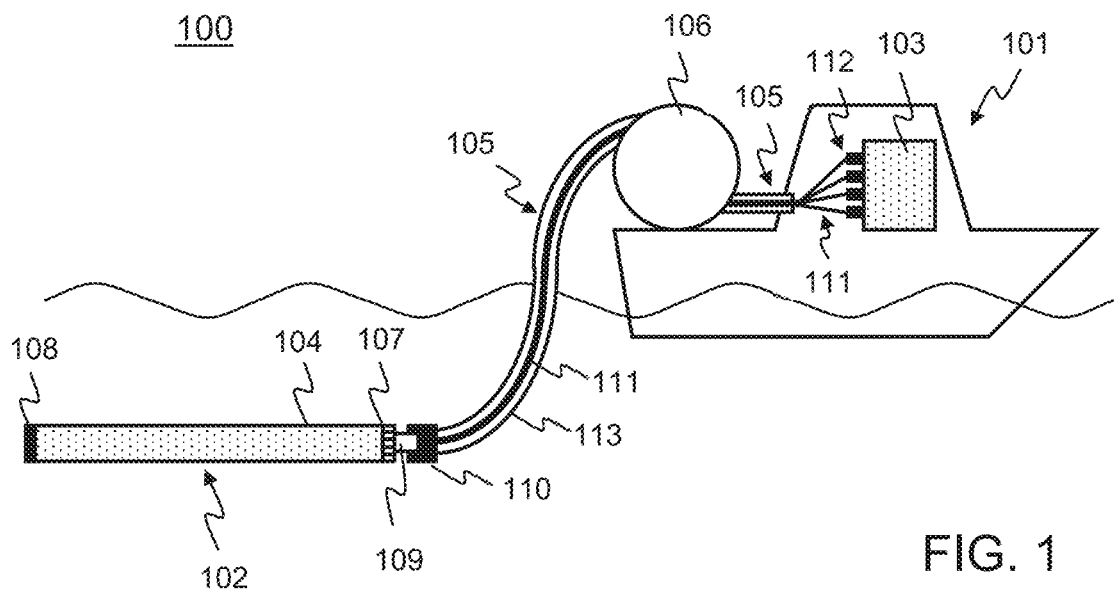
FIG. 1 is a schematic representation of an optical sensor system installed on a ship for acoustic measurements under water.

FIG. 1 schematically illustrates an optical sensor system 100 installed on a ship 101 for measurements underwater, such as, for example, acoustic measurements or seismic measurements, or both. FIG. 1 provides a schematic representation of the optical sensor system 100 and the ship 101 on which it is installed. The optical sensor system 100 comprises a hydrophone assembly 102 and an optical readout arrangement 103. The hydrophone assembly 102 comprises an encapsulating tube 104 in which several hydrophones are incorporated. The hydrophones are not represented in FIG. 1 for the sake of simplicity. The optical readout arrangement 103 may correspond with, for example, that described in patent publication WO2017026896A1. The hydrophone assembly 102 may be coupled to the optical readout arrangement 103 through a lead-in cable 105.

In the schematic representation of FIG. 1, the hydrophone assembly 102 is in a deployed state. The hydrophones are underwater and may be at relatively great depth in a sea or in an ocean. The hydrophone assembly 102 may be positively buoyant. The lead-in cable 105 may be negatively buoyant. This allows the hydrophone assembly 102 to float underwater when towed behind the ship. The lead-in cable 105 should be sufficiently long for the hydrophone assembly 102 to float underwater at a given desired depth.

The hydrophone assembly 102 and the lead-in cable 105 may be wound on a winch 106 that is present on the ship. The hydrophone assembly 102 is then in a retracted state. The winch 106 may have a diameter comprised between, for example, of 1 and 2 meters. In that case, the hydrophone assembly 102 may have a diameter less than 60 mm so as to allow reliable and easy winding on the winch 106. In case the winch 106 has a diameter of 1 meter, the hydrophone assembly 102 may have a diameter less than 30 mm.

The hydrophone assembly 102 comprises a sealing interface 107 that is fitted on a front end of the encapsulating tube 104, which seals off the encapsulating tube 104 on this end. A rear end of the encapsulating tube 104 may be sealed off by a sealing plug 108. The sealing interface 107 of the hydrophone assembly 102 comprises a receptacle 109 with various optical connectors such as, for example, optical APC contacts. These contacts may have a minimum return loss of 60 dB.

The lead-in cable 105 has a submersible end that is provided with a coupling plug 110, which is complementary with the receptacle 109 of the hydrophone assembly 102. Thus, the coupling plug 110 of the lead-in cable 105 comprises optical connectors that match with those of the receptacle 109 of the hydrophone assembly 102. Optical fibers 111 extend from the optical connectors of the coupling plug 110 of the lead-in cable 105 to APC connectors 112. A protective jacket 113 encloses these optical fibers 111 in the lead-in cable 105. The optical fibers 111 may fan out from an onboard end of the lead-in cable 105 so as to be coupled to the optical readout arrangement 103 through the APC connectors 112. All aforementioned optical connectors may be dry mating.

Figure 2:
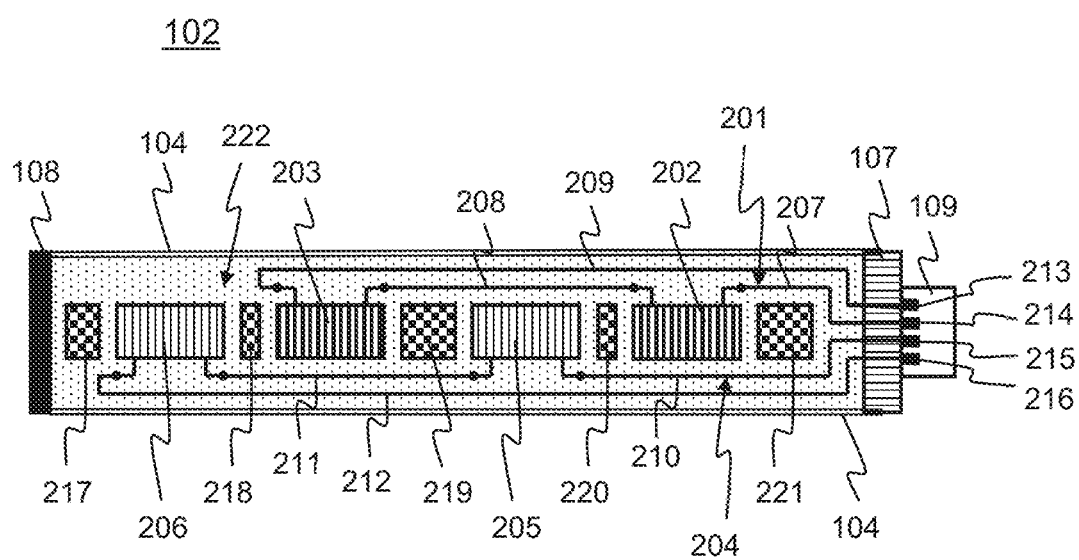
FIG. 2 is a schematic representation of a hydrophone assembly that forms part of the optical sensor system.

FIG. 2 schematically illustrates the hydrophone assembly 102 in some more detail. FIG. 2 provides a schematic representation of the hydrophone assembly 102. The encapsulating tube 104 with the sealing interface 107 and the sealing plug 108, which were mentioned hereinbefore and form part of the hydrophone assembly 102, are represented. The encapsulating tube 104 may essentially be made of example, polyurethane.

The hydrophone assembly 102 comprises a sensing arm 201 that, in this embodiment, includes two hydrophones 202, 203 only for the sake of simplicity of explanation. The two hydrophones 202, 203 are optically coupled in series. One of the two hydrophones 202, 203 will be referred to as first hydrophone 202 and the other hydrophone will be referred to a second hydrophone 203 for the sake of convenience.

The hydrophone assembly 102 further comprises a reference arm 204 that includes two reference devices 205, 206. The two reference devices 205, 206 are also coupled in series. One of the two reference devices 205, 206 will be referred to as first reference device 205 and the other will be referred to as second reference device 206 for the sake of convenience. The first reference device 205 is associated with and adjacent to the first hydrophone 202. The second reference device 206 is associated with and adjacent to the second hydrophone 203.

The sensing arm 201 may comprise various coupling optical fibers 207-209 as illustrated in FIG. 2 including a coupling optical fiber 208 between the first hydrophone 202 and the second hydrophone 203. Likewise, the reference arm 204 may comprise various coupling optical fibers 210-212 including a coupling optical fiber 211 between the first reference device 205 and the second reference device 206. These coupling optical fibers 210-212 may be provided with a shielding tube that provides mechanical protection. The shielding tube may have a diameter of, for example, 900 µm.

In this embodiment, one end of the sensing arm 201 is coupled to an optical connector 213 of the receptacle 109 of the hydrophone assembly 102. Another end of the sensing arm 201 is coupled to another optical connector 214 of the same receptacle 109. Similarly, one end of the reference arm 204 is coupled to yet another optical connector 215 of the receptacle 109 of the hydrophone assembly 102. Another end of the reference arm 204 is coupled to yet another optical connector 216 of the same receptacle 109. This two-end coupling provides redundancy, which enhances reliability. If the sensing arm 201 is broken at one point, this will not prevent optical readout of both two hydrophones 202, 203. Similarly, if the reference arm 204 is broken at one point, this too will not prevent optical readout of both two reference devices 205, 206.

The hydrophone assembly 102 may comprise light weight solid filling components 217-221 to achieve a desired degree of buoyance. These solid filling components 217-221 may essentially be made of, for example, low density marine foam. The solid filling components 217-221 may comprise one or more passages for optical fiber sections of the sensing arm 201 and of the reference arm 204. The solid filling components 217-221 may further comprise an axial center hole through which a cable may pass. These structural details are not represented in FIG. 2 for the sake of simplicity.

The encapsulating tube 104 may be filled with a liquid 222, which constitutes an exterior environment for the two hydrophones 202, 203 within the encapsulating tube 104. This filling liquid 222 may penetrate the two hydrophones 202, 203, which will be described hereinafter. The filling liquid 222 may comprise, for example, any of the following liquids: paraffin oil, kerosene, silicone oil, and water, or any combination of these.

Figure 3:
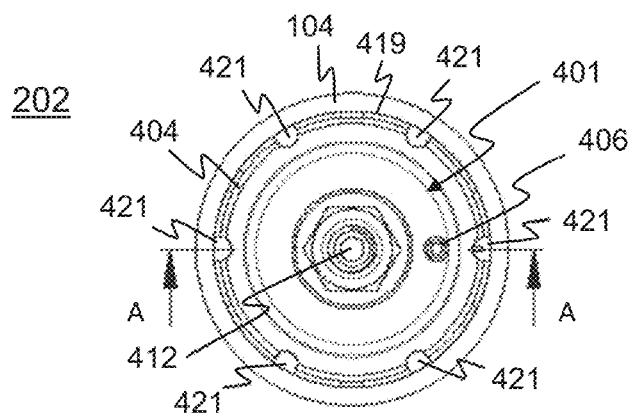
FIG. 3 is a schematic front view of a hydrophone incorporated in an encapsulating tube, which are part of the hydrophone assembly.
Figure 4:
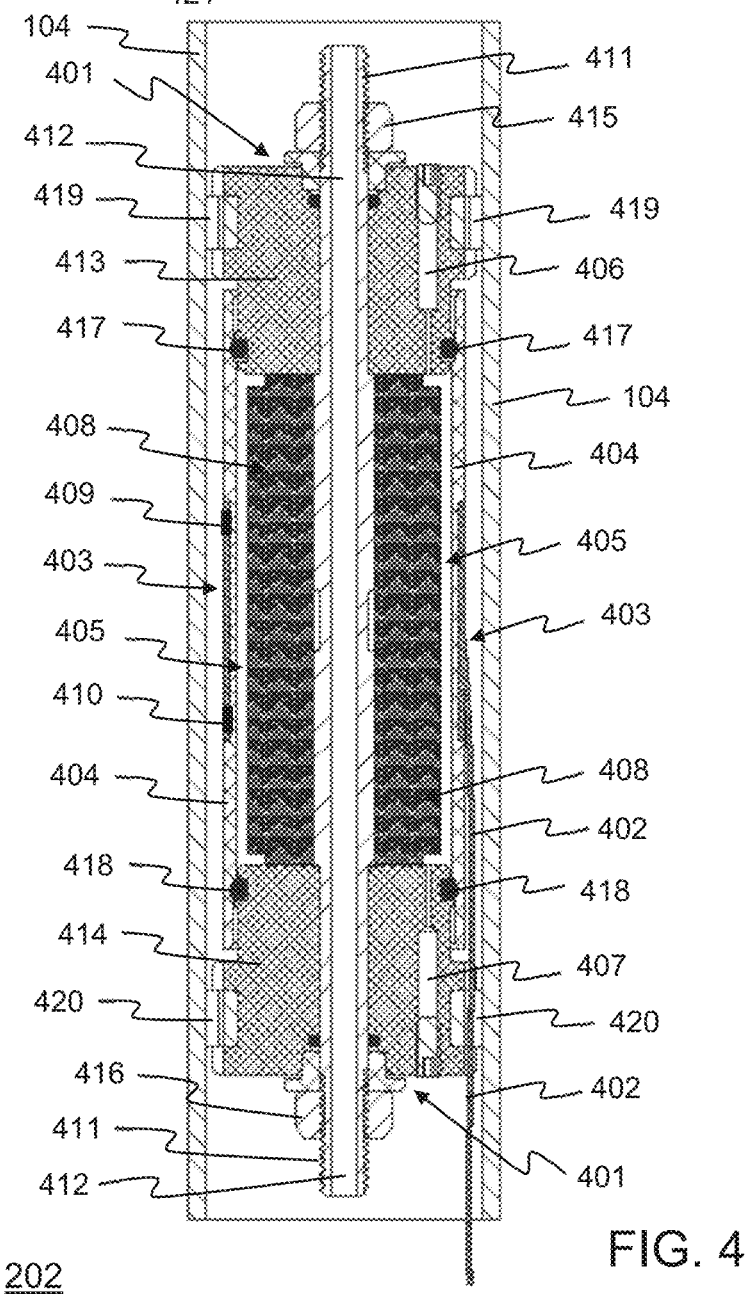
FIG. 4 is a schematic cross-sectional view of the hydrophone along a cut plane indicated in FIG. 3.
Figure 5:
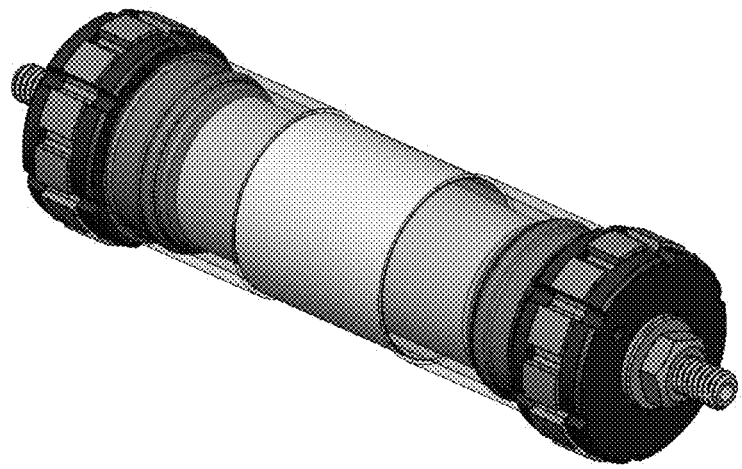
FIG. 5 is a schematic perspective view of the hydrophone.

FIGS. 3, 4 and 5 illustrate the first hydrophone 202 in the hydrophone assembly 102. FIG. 3 provides a schematic front view of the first hydrophone 202 incorporated in the encapsulating tube 104 of the hydrophone assembly 102 presented hereinbefore with reference to FIG. 2. FIG. 4 provides a schematic cross-sectional view of the first hydrophone 202 incorporated in the encapsulating tube 104 along a cut plane A-A indicated in FIG. 3. FIG. 5 provides a schematic perspective view of the first hydrophone 202 itself. The second hydrophone 203 may be identical to the first hydrophone 202 illustrated in FIGS. 3, 4 and 5, or at least similar. Accordingly, the first hydrophone 202 described in greater detail hereinafter with reference to FIGS. 3, 4 and 5 will be referred to as hydrophone 202 for the sake of convenience, unless a distinction between hydrophones needs to be made.

The hydrophone 202 comprises a mandrel 401 and an optical fiber 402 having an optical sensing section 403 that is wound on the mandrel 401. The optical sensing section 403 thus conforms with an exterior surface of the mandrel 401. The mandrel 401 may have a diameter that is smaller than 60 mm, at least sufficiently small so that the hydrophone assembly 102 may have a diameter less than 60 mm, or even less than 30 mm. As mentioned hereinbefore, this allows reliable and easy winding on the winch 106 in the optical sensor system 100 illustrated in FIG. 1.

The optical fiber 402 of the hydrophone 202 constitutes a section of the sensing arm 201 in the hydrophone assembly 102 described hereinbefore with reference to FIG. 2. The optical sensing section 403 of the optical fiber 402, which is wound on the mandrel 401, may be several meters longs, for example. The optical sensing section 403 has an optical characteristic that varies as a function of a radial dimension of the mandrel 401. Variations in hydrostatic pressure that is exerted on the mandrel 401 may cause corresponding variations in the radial dimension. Accordingly, the variations in hydrostatic pressure will also cause corresponding variations in the optical characteristic of the optical sensing section 403 in the sensing arm 201, which can be measured.

The optical sensing section 403 is wound on the mandrel 401 over a length that is related to variations in hydrostatic pressure to be measured. In principle, pressure variations are best measured up to a frequency that corresponds to a wavelength that is half the aforementioned length, or half the diameter of the mandrel 401, whichever is the longest. At higher frequencies, measurement performance may be less. There is a relation between frequency and wavelength that is defined by acoustical properties of a medium in which pressure waves propagate, which may be, for example, water, salt water, in contemplated applications of the hydrophone 202.

The optical sensing section 403 may be wound on the mandrel 401 in a number of optical fiber layers comprised between 1 and 5. It has been found that a degree of change in the optical characteristic of the optical sensing section 403 increases less than proportional with the number of optical fiber layers wound on the mandrel 401. Moreover, the greater the number of optical fiber layers that is wound on the mandrel 401 is, the stiffer the optical sensing section 403 that is wound on the mandrel 401 becomes. Such an increase in stiffness makes this combination of the optical sensing section 403 and the mandrel 401 less compliant to pressure variations. Less compliance to pressure variations translates into less optical measurement sensitivity. Thus, a number of optical fiber layers comprised between 1 and 5 may contribute to optical measurement sensitivity.

The optical fiber 402 may be relatively thin, which implies that the optical sensing section 403 is relatively thin. For example, the optical fiber 402 with the optical sensing section 403 comprised therein may have a thickness that is less than 150 µm. In principle, the thinner the optical fiber 402 is, the more compliant the combination of the optical sensing section 403 and the mandrel 401 will be to pressure variations. However, the thinner the optical fiber 402 is, the more fragile it is. A satisfactory compromise may be found. For example, a prototype of the hydrophone 202 presented with reference to FIGS. 3, 4 and 5 have been made, wherein the optical fiber 402 was 80 µm thick with a 106 µm coating.

The mandrel 401 comprises a shell 404, which constitutes a cylindrical support for the optical sensing section 403. The shell 404 may essentially be made of, for example, polycarbonate. The optical sensing section 403 is wound on a middle part of the shell 404. The shell 404 may have a smaller thickness in its middle part than in its end parts between which the middle part is comprised. This contributes to the mandrel 401 being a relatively compliant to pressure variations and thus contributes to optical measurement sensitivity.

A cylindrical cavity 405 is inwardly adjacent to the shell 404 as illustrated in FIG. 4. In this embodiment, two passages 406, 407 in the mandrel 401 provide fluid communication between the cylindrical cavity 405 and an exterior environment surrounding the mandrel 401. Thus, the cylindrical cavity 405 may be filled with the filling liquid 222 in the encapsulating tube 104 illustrated in FIG. 2 when the hydrophone 202 is within this encapsulating tube 104. The cylindrical cavity 405 may thus comprise, for example, paraffin oil, kerosene, silicone oil, or water, or any combination of these.

The two passages 406, 407 in the mandrel 401 allow transfer of a hydrostatic pressure that is exerted on the hydrophone 202 to the filling liquid 222 in the cylindrical cavity 405 inside the mandrel 401. Accordingly, a hydrostatic pressure that is exerted on an exterior side of the shell 404, as well as on the optical sensing section 403 that is present on the shell 404, is compensated by a similar hydrostatic pressure on an interior side of the shell 404. Accordingly, this prevents the shell 404 and the optical sensing section 403 from continuously undergoing strain, in particular in an environment where hydrostatic pressure is high. Nonetheless, the shell 404 and the optical sensing section 403 may be relatively compliant to variations in hydrostatic pressure, which contributes to optical measurement sensitivity at relatively great depth.

The two passages 406, 407 in the mandrel 401 may have a shape and dimensions that prevent relatively rapid external pressure variations from being transferred to the filling liquid 222 in the cylindrical cavity 405. Accordingly, relatively rapid external pressure variations may cause relatively rapid variations in the radial dimension of the mandrel 401 and thus cause relatively rapid variations in the optical characteristic of the optical sensing section 403. Conversely, relatively slow external pressure variations are transferred to the filling liquid 222 in the cylindrical cavity 405. Accordingly, relatively slow external pressure variations will be compensated for and, as a result, may not cause significant variations in the radial dimension of the mandrel 401 and thus not cause significant variations in the optical characteristic of the optical sensing section 403.

Thus, the two passages 406, 407 in the mandrel 401 thus provide a high pass filter function with respect to optical measurement of pressure variations. The high-pass filter function may be characterized by a cutoff frequency. External pressure variations that are well below the cutoff frequency may not be optically measured, whereas external pressure variations that are above the cutoff frequency may be optically measured. The two passages 406, 407 may provide a cutoff frequency in a range between, for example, 0.1 Hertz (Hz) and 20 Hz. The cutoff frequency depends on various factors, which include the shape and the dimensions of the two passages 406, 407, the filling liquid 222 and material-related properties of the mandrel 401. The two passages 406, 407 may each comprise a capillary having a diameter comprised between, for example, 0.1 millimeter (mm) and 1 mm, and a length comprised between, for example, 1 mm and 10 mm.

FIG. 4 illustrates a particular feature of the hydrophone 202, which is that the mandrel 401 comprises a core 408 of solid material having a relatively low bulk modulus as illustrated in FIG. 4. Accordingly, the cylindrical cavity 405 is comprised between the shell 404 and the core 408 of solid material having a relatively low bulk modulus. The term "bulk modulus" in relation with a material designates a degree of resistance to compression of the material. Bulk modulus may be defined as the ratio between pressure increase and a resulting decrease in volume of the material. A unit for bulk modulus is Pascals (Pa) per square meter ($m^2$), whereby the notation "GPa" expresses gigapascal per square meter. The solid material of the core 408 may have a bulk modulus that is smaller than, for example, 0.1 gigapascal (GPa). The solid material of the core 408 may comprise at least one of the following materials: closed cell low density foam, also known as "marine foam", and cork.

The hydrophone 202 may be relatively sensitive to pressure variations caused by, for example, acoustic waves and thus allow detection of relatively weak acoustic waves. This is mainly thanks to the core 408 comprising solid material having a relatively low bulk modulus material. Relatively small pressure variations may cause relatively significant variations in the diameter of the mandrel 401 because the mandrel 401 as a whole is relatively compliant to pressure variations. The more significant variations in diameter are, the more significant the variations in optical characteristics are, which can be detected, and, thus, the more sensitive the hydrophone 202 is.

Indeed, the core 408 of solid material, which has a relatively low bulk material, contributes to the mandrel 401 as a whole being relatively compliant. In fact, the mandrel 401 may be more compliant than a mandrel where the core 408 of solid material is substituted by the filling liquid 222, which implies the mandrel being hollow. The mandrel 401 may also be more compliant than a mandrel in which the core 408 of solid material is substituted by another entity, such as, for example, a hollow cylinder as in patent publication U.S. Pat. No. 7,466,631B1 cited hereinbefore.

The hydrophone 202 presented with reference to FIGS. 3-5 may also present a relatively great resistance to hydrostatic pressure, which, in principle, is a requirement that conflicts with the hydrophone 202 being sensitive. The core 408 of solid material, which has a relatively low bulk modulus, may withstand a relatively great hydrostatic pressure that will be exerted through the filling liquid 222. Referring to FIG. 2, the filling liquid 222 undergoes the hydrostatic pressure through the encapsulating tube 104 and transfers this pressure to the cylindrical cavity 405 through the passage. Thus, the hydrophone 202 presented with reference to FIGS. 3-5 is particularly suited for sensitive measurement underwater at relatively great depth.

Concerning optical detection of pressure variations, in this embodiment, the optical sensing section 403 comprises two optical semi-reflective structures 409, 410 as schematically illustrated in FIG. 4. The two optical semi-reflective structures 409, 410 allow an interferometry-based measurement of an optical path length between these. In this embodiment, one of the two optical semi-reflective structures 409, 410 comprises a fiber Bragg grating, which will be referred to hereinafter as first fiber Bragg grating 409 for the sake of convenience. The other optical semi-reflective structure also comprises a fiber Bragg grating, which will be referred to hereinafter as second fiber Bragg grating 410.

These fiber Bragg grating may be spaced apart, for example, several meters, which implies a physical path length between the two optical semi-reflective structures 409, 410 that the fiber Bragg gratings form.

Concerning structural details of this embodiment, the hydrophone 202 comprises a rod-like support member 411 on which the core 408 of solid material is axially mounted as illustrated in FIG. 4. The rod-like support member 411 may be hollow, comprising an axial center hole 412 as illustrated in FIGS. 3 and 4 through which a cable may pass. The rod-like support member 411 may essentially be made of, for example, steel.

A pair of cylindrical support members 413, 414 is mounted on the rod-like support member 411. The core 408 of solid material is disposed between the pair of cylindrical support members 413, 414 as illustrated in FIG. 4. A pair of clamping members 415, 416 clamp the core 408 between the pair of cylindrical support members 413, 414. In this embodiment, the clamping members 415, 416 are in the form of nuts that are screwed on threaded end portions of the rod-like support member 411. Washers may be provided between the nuts and the cylindrical support members 413, 414 as illustrated in FIG. 4.

A pair of O-rings 417, 418 is provided between the pair of cylindrical support members 413, 414 and the shell 404. One these O-rings 417 is radially disposed between the shell 404 and one cylindrical support member 413 of the pair of cylindrical support members 413, 414. The other O-ring 418 is radially disposed between the shell 404 and the other cylindrical support member 414 of the pair of cylindrical support members 413, 414. Further O-rings are provided between the pair of cylindrical support members 413, 414 and the rod-like support member 411. The aforementioned O-rings have a sealing function.

A pair of hydrophone fitting members 419, 420 is disposed between the encapsulating tube 104 and the hydrophone 202 as illustrated in FIGS. 4 and 5. More specifically, a hydrophone fitting member 419 is circularly disposed between one cylindrical support member 413 of the pair of cylindrical support members 413, 414 and the encapsulating tube 104. A further hydrophone fitting member 420 is circularly disposed between the other cylindrical support member 414 of the pair of cylindrical support members 413, 414. The hydrophone fitting members 419, 420 contribute to an appropriate centering of the hydrophone 202 in the encapsulating tube 104. In addition, the hydrophone fitting members 419, 420 may provide sufficient friction to keep the hydrophone 202 in place within the encapsulating tube 104 and thus within the hydrophone assembly 102. The hydrophone fitting members 419, 420 may essentially be made of, elastic material, such as, for example, neoprene, soft rubber, or foam material, or any combination of these. In this embodiment, the hydrophone fitting members 419, 420 are provided with slots 421. These slots 421 may constitute passages for optical fibers and the filling liquid 222 in the hydrophone assembly 102 mentioned hereinbefore with reference to FIG. 2.

Figure 6:
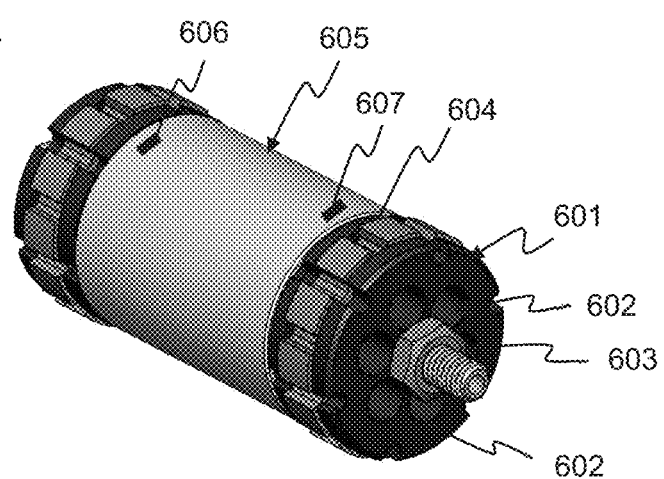
FIG. 6 is a schematic perspective view of a reference device in the hydrophone assembly.

FIG. 6 schematically illustrates the first reference device 205 in the hydrophone assembly 102. FIG. 6 provides a schematic perspective view of first reference device 205 in the hydrophone assembly 102. The second reference device 206 may be identical to the first reference device 205 illustrated in FIG. 6, or at least similar. Accordingly, the first reference device 205 described in greater detail hereinafter with reference to FIG. 6 will be referred to as reference device 205 for the sake of convenience, unless a distinction between reference devices needs to be made.

The reference device 205 comprises a stiff mandrel 601 that has a high-bulk modulus. Accordingly, in contrast with the mandrel 401 of the hydrophone 202 discussed hereinbefore with reference to FIGS. 3, 4, and 5, the stiff mandrel 601 will essentially not be compliant to pressure variations or, at least, will be compliant to a much lesser degree. The stiff mandrel 601 of the reference device 205 may have a diameter similar to that of the mandrel 401 of the hydrophone 202. The stiff mandrel 601 may comprise longitudinally extending holes 602 as illustrated in FIG. 6. This contributes to the stiff mandrel 601 being relatively lightweight and therefore contributes to the hydrophone assembly 102 being relatively lightweight. The stiff mandrel 601 may further comprise an axial center hole 603 through which a cable may pass, similar to that in the mandrel 401 of the hydrophone 202.

The reference device 205 comprises an optical fiber 604 that constitutes a section of the reference arm 204 in the hydrophone assembly 102 described hereinbefore with reference to FIG. 2. The optical fiber 604 of the reference device 205 has an optical sensing section 605 that is wound on the stiff mandrel 601. The optical sensing section 605 comprised therein may be similar to the optical sensing section 403 of the optical fiber 402 of the hydrophone 202 in the sensing arm 201. Thus, the optical sensing section 605 of the reference device 205 may comprise two optical semi-reflective structures 606, 607, one of which may be a first fiber Bragg grating 606, the other being a second fiber Bragg grating 607. Accordingly, the optical sensing section 605 in the reference device 205 has a corresponding optical characteristic, which is an optical path length between the first fiber Bragg grating 606 and the second fiber Bragg grating 607, that varies as a function of a radial dimension of the stiff mandrel 601. Since the stiff mandrel 601 is essentially not compliant, this optical characteristic of the optical sensing section 605 of the reference device 205, which is in the reference arm 204, is essentially constant, irrespective of pressure variations that may occur.

The hydrophone assembly 102 illustrated in FIG. 2 may be manufactured as follows. First, the two hydrophones 202, 203 and the two reference devices 205, 206 may be individually manufactured. Each of the two hydrophones 202, 203 may thus be an individual intermediate product corresponding with the hydrophone 202 described hereinbefore with reference to FIGS. 3, 4, and 5. Similarly, each of the two reference devices 205, 206 may thus be an individual intermediate product corresponding with the reference device 205 described hereinbefore with reference to FIG. 6.

The two hydrophones 202, 203, the two reference devices 205, 206 and the sealing interface 107 may be placed on an assembly surface. The first hydrophone 202, the second hydrophone 203, the first reference device 205, the second reference device 206 are placed at respective positions with respect to the sealing interface 107 that these should have in the encapsulating tube 104. The solid filling components 217-221 may be placed in between the aforementioned entities. A cable may pass through the aforementioned entities, more specifically, through the axial center holes in the two hydrophones 202, 203 and in the two reference devices 205, 206, as well as through the axial center holes solid filling components 217-221. An end of the cable may be coupled to the sealing interface 107. The cable may essentially be made of, for example, steel or polyethylene and may have a diameter comprised between, for example, 1 mm and 2 mm. Accordingly, an assembly is obtained that may be designated as basic intermediate hydrophone assembly.

The coupling optical fibers 207-212, may be added to the basic intermediate hydrophone assembly so as to form the sensing arm 201 by coupling the two hydrophones 202, 203 with each other and to optical connectors 213, 214 in the receptacle 109 of the sealing interface 107. The reference arm 204 may be formed by coupling the two reference devices 205, 206 with each other and to other optical connectors 215, 216 in the receptacle 109 of the sealing interface 107. An optical fiber may be coupled to another optical fiber by means of, for example, splicing. For example, an end of the optical fiber 402 in the first hydrophone 202 may be spliced to an end of coupling optical fiber 207 of which another end is spliced to an optical fiber that extends from optical connector 213 in the receptacle 109 of the sealing interface 107. Another end of the optical fiber 402 in the first hydrophone 202 may be spliced to an end of the coupling fiber 208 of which another end is spliced to the optical fiber in the second hydrophone 203. As mentioned hereinbefore, the coupling optical fibers 207-209 may be provided with a shielding tube that provides mechanical protection. The basic intermediate hydrophone assembly to which the coupling optical fibers 207-212 have been added may be designated as optically coupled intermediate hydrophone assembly.

The optically coupled intermediate hydrophone assembly may be pulled through the encapsulating tube 104 by means of the cable. In order to facilitate this operation, and to prevent damage, the encapsulating tube 104 may be lubricated beforehand. Indeed, this operation, as well as further operations, should be carried out with sufficient care so as to avoid damaging splices that have been made, as well as other relatively fragile elements. Other fragile elements include, for example, the optical fibers of the two hydrophones 202, 203 and of the two reference devices 205, 206, which are relatively thin.

Once the intermediate hydrophone assembly is appropriately fitted in the encapsulating tube 104, the sealing interface 107 will be located at the front end of the encapsulating tube 104. The sealing interface 107 may then be fixed to the front end of the encapsulating tube 104 by means of, for example, a heat shrink hose. The optically coupled intermediate hydrophone assembly that is fitted in the encapsulating tube 104, with the sealing interface 107 fixed thereto, may be designated as encapsulated intermediate hydrophone assembly.

The filling liquid 222 may then be poured into the encapsulated intermediate hydrophone assembly through the rear end, which is still open. As mentioned hereinbefore, the filling liquid 222 may comprise, for example, any of the following liquids: paraffin oil, kerosene, silicone oil, and water, or any combination of these. Once a sufficient quantity of the filling liquid 222 has been poured into the encapsulated intermediate hydrophone assembly, a partially open plug may be fixed on the rear end of the encapsulating tube 104. The partially open plug has a hole allowing evasion of any air bubbles that may still be present the encapsulating tube 104. The encapsulated intermediate hydrophone assembly in which filling liquid 222 has been poured and with the partially open plug at its rear end may be designated as encapsulated and filled intermediate hydrophone assembly.

The encapsulated and filled intermediate hydrophone assembly may be vertically hung in order to better evacuate any air bubbles therein. The aforementioned assembly may be vertically hung for a period comprised between, for example, 36 and 48 hours. Alternatively, or complementary, negative pressure may be applied to remove air bubbles.

After that, the hole in the partially open plug may be sealed so as to become the sealing plug 108 mentioned hereinbefore with reference to FIG. 2. The hydrophone assembly 102 illustrated in the same figure is then obtained.

The optical sensor system 100 illustrated in FIG. 1 with the hydrophone assembly 102 comprising hydrophones and reference devices described hereinbefore with reference to FIGS. 2-6, may basically operate as follows. The optical readout arrangement 103 may measure a first phase difference between light reflected by the first fiber Bragg grating 409 in the first hydrophone 202, which is in the sensing arm 201, and light reflected by the first fiber Bragg grating 606 of the reference device 205, which is in the reference arm 204. The optical readout arrangement 103 may further measure a second phase difference between light reflected by the second fiber Bragg grating 410 in the first hydrophone 202, which is in the sensing arm 201 and light reflected by the second fiber Bragg grating 607 of the reference device 205, which is in the reference arm 204. The optical readout arrangement 103 may then provide a measurement result based on a difference between the first phase difference and the second phase difference that have been measured. In a similar manner, the optical readout arrangement 103 may provide a further measurement result based of light reflections in the second hydrophone 203 in the sensing arm 201 and light reflections in the second reference device 206 in the reference arm 204.

As mentioned hereinbefore, the optical readout arrangement 103 may correspond with, for example, that described in patent publication WO2017026896A1. In that case, the first fiber Bragg grating 409 of the first hydrophone 202 and the first fiber Bragg grating 606 of the reference device 205 may both be semi-reflective in a first wavelength range. The second fiber Bragg grating 410 in the first hydrophone 202 and the second fiber Bragg grating 607 in the first reference device 205 may both be semi-reflective in a second wavelength range different from the first wavelength range. The same may apply to the respective fiber Bragg gratings of the second hydrophone 203 and of the second reference device 206.

The optical sensor system 100 may thus provide a measurement result that represents pressure variations that a hydrophone 202 undergoes. Acoustic waves or seismic waves, or both, may cause these pressure variations. Accordingly, the optical sensor system 100 allows making acoustic measurements and seismic measurements. These measurements may be relatively sensitive, accurate and precise and, moreover, may be carried out underwater at relatively great depth.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to optical measurements of pressure variations, which may be caused by various physical phenomena, such as, for example, dynamic behavior of a physical object or seismic activity. The invention may be applied in numerous domains, such as, for example, seismic underwater survey and underwater survey in general. Moreover, the hydrophone may be used for optical measurements in any type of medium where pressure variations may occur and convey information. Thus, the term "hydrophone" should be understood in a broad sense. The term may embrace any device that allows optical measurements of pressure variations exerted on the device.

There are numerous different ways of implementing a hydrophone in accordance with the invention. In the presented embodiments, the mandrel comprises a rod-like support member on which various components are actually mounted. In other embodiments, such a rod-like support member may be dispensed with. For example, spacers may be used to define the cylindrical cavity between the shell and the core of solid material having a relatively low bulk modulus.

There are numerous different ways of implementing an optical sensing section in a hydrophone in accordance with the invention. In the presented embodiments, the optical sensing section comprises two optical semi-reflective structures in the form of fiber Bragg gratings. In other embodiments, the optical sensing section may comprise, for example, a single fiber Bragg grating. In yet other embodiments, the optical sensing section may comprise interferometric structures, such as, for example, Fabry Perot structures.

There are numerous different ways of implementing a hydrophone assembly in accordance with the invention. In the presented embodiments, the hydrophone assembly comprises a reference device associated with a hydrophone. This allows using an optical readout technique as described in patent publication WO2017026896A1. In other embodiments, the reference device may be dispensed with and the different optical readout technique may be used. In the presented embodiments, the hydrophone assembly comprises two hydrophones only for the sake of simplicity of explanation. In other embodiments, the hydrophone assembly may comprise more than two hydrophones or a single hydrophone only. In a hydrophone assembly that comprises multiple hydrophones, the hydrophones may be coupled so that these form separate groups of hydrophones.

In general, there are numerous different ways of implementing the invention, whereby different implementations may have different topologies. In any given topology, a single entity may carry out several functions, or several entities may jointly carry out a single function. In this respect, the drawings are very diagrammatic.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A hydrophone comprising:
   a mandrel comprising:
   a shell;
   a cylindrical cavity inwardly adjacent to the shell; and a passage that provides fluid communication between the cylindrical cavity and an exterior environment surrounding the mandrel; and an optical fiber comprising an optical sensing section that is at least partially wound on the mandrel, the optical sensing section having an optical characteristic that varies as a function of a radial dimension of the mandrel, wherein the mandrel comprises a core of solid material having a bulk modulus lower than 0.1 GPa, the cylindrical cavity being comprised between the core and the shell.

2. A hydrophone according to claim 1, wherein the optical sensing section comprises two optical semi-reflective structures adapted for an interferometry-based measurement of an optical path length between the two optical semi-reflective structures.

3. A hydrophone according to claim 1, wherein the two optical semi-reflective structures comprise fiber Bragg gratings.

4. A hydrophone according to claim 3, wherein one of the two optical semi-reflective structures comprises a fiber Bragg grating that is semi-reflective in a first wavelength range and the other optical semi-reflective structure comprise another fiber Bragg grating that is semi-reflective in a second wavelength range different from the first wavelength range.

5. A hydrophone according to claim 1, wherein the hydrophone comprises a rod-like support member on which the core of solid material is axially mounted.

6. A hydrophone according to claim 5, wherein the rod-like support member is hollow, comprising an axial center hole.

7. A hydrophone according to claim 5, wherein the hydrophone comprises a pair of cylindrical support members mounted on the rod-like support member, the core of solid material being disposed between the pair of cylindrical support members.

8. A hydrophone according to claim 7, wherein the hydrophone comprises a pair of clamping members adapted to clamp the core of solid material between the pair of cylindrical support members.

9. A hydrophone according to claim 7, wherein the hydrophone comprises a pair of O-rings one of which is radially disposed between the shell and one cylindrical support member of the pair of cylindrical support members, the other O-ring being radially disposed between the shell and the other cylindrical support member of the pair of cylindrical support members.

10. A hydrophone according to claim 1, wherein the optical sensing section is wound on a middle part of the shell, the shell having a smaller thickness in its middle part than in its end parts between which the middle part is comprised.

11. A hydrophone according to claim 1, wherein the optical sensing section is wound on the mandrel in a number of optical fiber layers comprised between 1 and 5.

12. A hydrophone according to claim 1, wherein the optical fiber has a thickness that is less than 150 μm.

13. A hydrophone according to claim 1, wherein the core of solid material comprises at least one of the following materials: closed cell low density foam, also known as "marine foam", and cork.

14. A hydrophone according to claim 1, wherein the cylindrical cavity comprises comprising at least one of the following liquids: paraffin oil, kerosene, silicone oil, and water.

15. A hydrophone according to claim 1, wherein the shell comprises polycarbonate.

16. A hydrophone according to claim 1, wherein the mandrel has a diameter that is smaller than 60 mm.

17. A hydrophone assembly comprising an encapsulating tube that incorporates a hydrophone according to claim 1.

18. A hydrophone assembly according to claim 17 comprising:

a sensing arm of which the hydrophone forms part; and a reference arm comprising a reference device incorporated in the encapsulating tube, the reference device comprising:

a stiff mandrel that has a high-bulk modulus; and an optical fiber wound around the stiff mandrel, the optical fiber comprising an optical sensing section that is at least partially wound on the stiff mandrel, the optical sensing section being similar to the optical sensing section of the optical fiber of the hydrophone in the sensing arm.

19. A hydrophone assembly according to claim 18, wherein the reference device is adjacent to the hydrophone.

20. A hydrophone assembly according to claim 18, wherein the stiff mandrel comprises longitudinally extending holes.

21. A hydrophone assembly according to claim 18, wherein at least one elastic fitting member is disposed between the encapsulating tube and the hydrophone.

22. A hydrophone assembly according to claim 17, wherein the encapsulating tube and the cylindrical cavity of the hydrophone comprise a same liquid.

23. A hydrophone assembly according to claim 17, wherein the hydrophone assembly comprises a plurality of hydrophones whereby respective optical sensing sections in respective hydrophones are serially optically coupled to each other.

24. An optical sensor system comprising a hydrophone according to claim 1 and an optical read-out arrangement adapted to measure the optical characteristic of the optical sensing section in the hydrophone.

25. An optical sensor system according to claim 24, wherein the optical sensor system comprises a hydrophone assembly comprising:

an encapsulating tube;

a sensing arm of which the hydrophone forms part; and a reference arm comprising a reference device incorporated in the encapsulating tube, the reference device comprising:

a stiff mandrel that has a high-bulk modulus; and an optical fiber wound around the stiff mandrel, the optical fiber comprising an optical sensing section that is at least partially wound on the stiff mandrel, the optical sensing section being similar to the optical sensing section of the optical fiber of the hydrophone in the sensing arm.

26. An optical sensor system according to claim 25, wherein the optical sensing section comprises two optical semi-reflective structures adapted for an interferometry-based measurement of an optical path length between the two optical semi-reflective structures, wherein the optical read-out arrangement is adapted to measure a first phase difference between light reflected by one of the two optical semi-reflective structures of the hydrophone in the sensing arm and light reflected by a corresponding one of two optical semi-reflective structures of the reference device in the reference arm, and to measure a second phase difference between light reflected by the other of the two optical semi-reflective structures of the hydrophone in the sensing arm and light reflected by the other of the two optical semi-reflective structures of the reference device in the reference arm, and to provide a measurement result based on a difference between the first phase difference and the second phase difference that have been measured.

27. An optical sensor system according to claim 26, wherein the two optical semi-reflective structures comprise fiber Bragg gratings, wherein one of the two optical semi-reflective structures comprises a fiber Bragg grating that is semi-reflective in a first wavelength range and the other optical semi-reflective structure comprise another fiber Bragg grating that is semi-reflective in a second wavelength range different from the first wavelength range, and wherein the optical read-out arrangement is adapted to generate light in the first wavelength range and in the second wavelength range, to inject the light in the sensing arm and in the reference arm, to measure the first phase difference as a phase difference between light in the first wavelength range emanating from the sensing arm and light in the first wavelength range emanating from the reference arm, and to measure the second phase difference as a phase difference between light in the second wavelength range emanating from the sensing arm and light in the second wavelength range emanating from the reference arm.

28. An optical sensing method comprising use of a hydrophone according to claim 1.

29. An optical sensing method according to claim 28, wherein the hydrophone assembly comprises an encapsulating tube, wherein the hydrophone assembly comprises a sensing arm of which the hydrophone forms part; and a reference arm comprising a reference device incorporated in the encapsulating tube, the reference device comprising a stiff mandrel that has a high-bulk modulus and an optical fiber wound around the stiff mandrel, the optical fiber comprising an optical sensing section that is at least partially wound on the stiff mandrel, the optical sensing section being similar to the optical sensing section of the optical fiber of the hydrophone in the sensing arm, wherein the optical sensing section comprises two optical semi-reflective structures adapted for an interferometry-based measurement of an optical path length between the two optical semi-reflective structures, and wherein the method comprises:

measuring a first phase difference between light reflected by one of the two optical semi-reflective structures of the hydrophone in the sensing arm and light reflected by a corresponding one of two optical semi-reflective structures of the reference device in the reference arm;

measuring a second phase difference between light reflected by the other of the two optical semi-reflective structures of the hydrophone in the sensing arm and light reflected by the other of the two optical semi-reflective structures of the reference device in the reference arm; and providing a measurement result based on a difference between the first phase difference and the second phase difference that have been measured.

30. An optical sensing method according to claim 27, wherein the two optical semi-reflective structures comprise fiber Bragg gratings, wherein one of the two optical semi-reflective structures comprises a fiber Bragg grating that is semi-reflective in a first wavelength range and the other optical semi-reflective structure comprise another fiber Bragg grating that is semi-reflective in a second wavelength range different from the first wavelength range, and wherein the method comprises:

generating light in the first wavelength range and in the second wavelength range;

injecting the light in the sensing arm and in the reference arm;

measuring the first phase difference as a phase difference between light in the first wavelength range emanating from the sensing arm and light in the first wavelength range emanating from the reference arm;

measuring the second phase difference as a phase difference between light in the second wavelength range emanating from the sensing arm and light in the second wavelength range emanating from the reference arm.

* * * * *